United States Patent [19]
Morris

[11] Patent Number: 5,244,638
[45] Date of Patent: * Sep. 14, 1993

[54] HIGH PRESSURE FURNACE
[75] Inventor: Donald E. Morris, Kensington, Calif.
[73] Assignee: The Regents of the University of California, Oakland, Calif.
[*] Notice: The portion of the term of this patent subsequent to Jul. 14, 2009 has been disclaimed.
[21] Appl. No.: 702,252
[22] Filed: May 17, 1991

Related U.S. Application Data
[63] Continuation-in-part of Ser. No. 326,374, Mar. 21, 1989, Pat. No. 5,130,104.
[51] Int. Cl.$^5$ .............................................. B01J 3/04
[52] U.S. Cl. ..................... 422/119; 422/202; 422/208; 422/240; 422/242; 422/307; 505/1
[58] Field of Search ............... 422/240, 242, 119, 202, 422/208, 307; 505/1

[56] References Cited
U.S. PATENT DOCUMENTS
1,159,865  11/1915  Pier ........................................ 422/242
2,547,521  4/1951  Buehler ................................ 422/242
3,201,203  8/1965  Cerveny .............................. 422/242

Primary Examiner—Jill A. Johnston
Attorney, Agent, or Firm—Townsend and Townsend Khourie and Crew

[57] ABSTRACT

A high temperature high pressure furnace has a hybrid partially externally heated construction. A metallic vessel fabricated from an alloy having a composition of at least 45% nickel, 15% chrome, and 10% tungsten is utilized (the preferred alloy including 55% nickel, 22% chrome, 14% tungsten, 2% molybdenum, 3% iron (maximum) and 5% cobalt (maximum). The disclosed alloy is fabricated into 1¼ or 2 inch, 32 mm or 50 mm bar stock and has a length of about 22 inches, 56 cm. This bar stock has an aperture formed therein to define a closed high temperature, high pressure oxygen chamber. The opposite and closed end of the vessel is provided with a small blind aperture into which a thermocouple can be inserted. The closed end of the vessel is inserted into an oven, preferably heated by standard nickel chrome electrical elements and having a heavily insulated exterior.

33 Claims, 11 Drawing Sheets

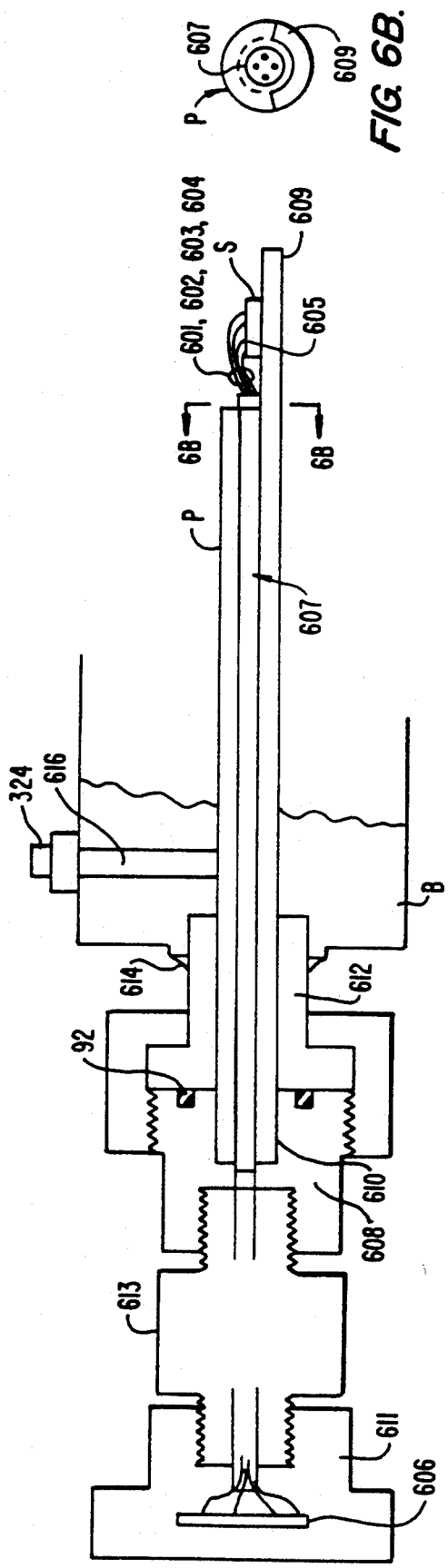
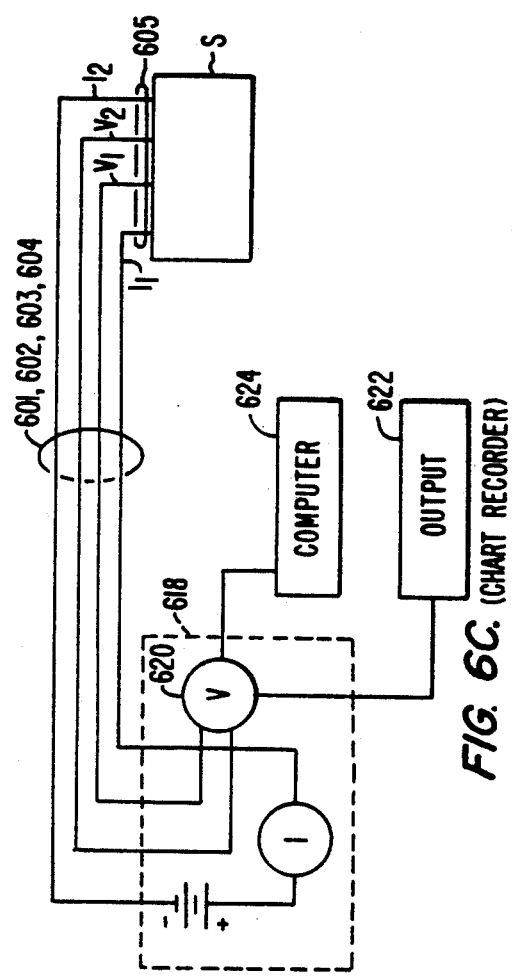
FIG. 6A.
FIG. 6B.
FIG. 6C. (CHART RECORDER)

HIGH PRESSURE FURNACE

GOVERNMENT RIGHTS NOTICE

The invention described herein arose in the course of or under Contract No. De-AC03-76-SF-0098 between the Department of Energy and the University of California at Berkeley.

This patent application is a continuation-in-part of U.S. patent application Ser. No. 07/326,374, filed Mar. 21, 1989, now U.S. Pat. No. 5,130,104.

BACKGROUND OF THE INVENTION

This invention relates to high pressure oxygen furnaces having utility for the synthesis of high temperature superconductors.

There are two general types of high pressure furnace systems capable of heating materials in the presence of high pressure oxygen. The first furnace system is the "internally heated" system which entails placing a furnace system inside a pressure vessel. The drawbacks to this design are that the pressure vessel must be large in order to accommodate the sample, and also the thermal insulation and the electrical heating element, and the necessary heating element is prohibitively expensive. This is so since platinum is the only metal that can withstand high pressure oxygen at high temperature.

First, the larger the volume of the pressure vessel, the more oxygen will be contained, and pressurized oxygen is hazardous. Second, the large pressure vessel must withstand high pressures. Large vessels for withstanding high pressures are quite expensive.

One advantage of this type of construction is that the system can be used at very high pressures and temperatures. This high temperature and high pressure is possible because the heated region is separate and inside the pressure containment vessel. The sample and heating element, which achieves and contains the high temperatures, are surrounded by insulation inside of the vessel. The pressure containing vessel is not exposed to high temperatures and can be made of high strength steel to withstand very high pressure. Furthermore, in an internally heated system, the platinum electrical heating element and the insulation can withstand high temperature (up to ~1500° C.) and do not have to be stressed to contain the pressure.

The second general type of high pressure oxygen furnace system is the "externally heated system". In this system, the pressure vessel is inserted inside the furnace. The main advantage of this design is that the pressure vessel is very small. This limits oxygen volume to a very small amount and minimizes the potential hazard. Also, the small size of the vessel makes it less expensive. Since the furnace heating element and insulation surround the pressure vessel, they are not exposed to high pressure or concentrated oxygen. This allows use of an economical, conventional, electrically heated furnace with base metal heating element.

This type of system, however, has two disadvantages. First, the furnace can only achieve limited temperatures and pressures because the vessel is heated and most metals normally used for vessels cannot withstand high pressure at a high temperature. Second, most metals burn with exposure to high pressure oxygen. This includes some of the strongest metals, such as titanium alloys, which react violently with high pressure oxygen and must be protected. Those metals that do not burn, such as the noble metals, platinum, gold, etc. become soft with exposure to high temperatures. Therefore they are unsuitable for pressure vessels. They are also very expensive.

Many metals and high strength alloys that do not burn or turn soft become embrittled upon exposure to high temperatures e.g., Haynes Alloy No. 214, (76% Ni, 16% Cr, 3% Fe, 4.5% Al, Y) becomes brittle because of formation of $Ni_3Al$ gamma prime in the temperature range of 600° C.–950° C. (page 2, Haynes Alloy No. 214 booklet, Cabot Corporation, Kokomi, Ind. 46902).

It should be understood in these types of externally heated high pressure oxygen ovens, because the oven is being heated and cooled each time the furnace system is used, the pressure vessel is likely to embrittle and become more quickly liable to catastrophic failure.

Temperatures of over 900° C. are necessary to make many superconductors. See Donald E. Morris, U.S. Pat. application Ser. No. 263,750, entitled Super Conductor, filed Oct. 28, 1988 and now abandoned. However, commercially available externally heated high pressure furnaces cannot reach the needed temperatures. They are mainly intended for inert atmospheres (as distinguished from oxygen), and are surely not rated to withstand the attack of hot concentrated (high pressure) oxygen.

A supplier of pressure vessels and reactors for use at high temperature and pressure is Leco Corporation, Tem-Pres Division, Bellefonte, Penna. 16823. They manufacture pressure vessels of materials identified as: 1) 316 Stainless Steel, 2) Unitemp L-605, 3) Rene and 4) $Rene^2$. According to Leco, 316 Stainless Steel is rated for a maximum temperature of 550° C., Unitemp L-605 and Rene are rated to a maximum of 750° C. and $Rene^2$ attains 900° C. (Specification sheets LRA-488 and MRA-1085, Leco Corporation, Tem-Pres Division).

Another supplier of such apparatus is Parr Instruments, Moline, Ill. 61265. They produce pressure vessels of 1) Monel 400, 2) Inconel 600, 3) Hastelloy C-276, 4) Hastelloy B-2, 5) Titanium, 6) Nickel, 7) Zirconium, 8) Carpenter 20Cb-3, 9) C1018 carton steel, 10) 303 Stainless Steel and 11) 316 Stainless Steel (pages 8–10, Parr Instruments "Reactors and Pressure Vessels" catalog). According to page 11 of Parr Instruments catalog, the maximum temperature of any of these materials is only 600° C., specified for 316 Stainless Steel, Inconel 600, and Hastelloy C-276. It is clear that all of these available pressure vessels are inadequate for synthesizing or heat treating superconducting materials at temperatures in the range of 900–1000° C. at high pressures.

SUMMARY OF THE INVENTION

A high temperature high pressure furnace having a hybrid partially externally heated construction is disclosed. A metallic vessel fabricated from an alloy having a composition of 55% nickel, 20% chrome, and 10% tungsten is utilized (the preferred alloy including 55% nickel, 22% chrome, 14% tungsten, 2% molybdenum, 3% iron (maximum) and 5% cobalt (maximum). The disclosed alloy is fabricated into 3.2 cm or 5 cm bar stock and has a length of about 50 cm. This bar stock then has an aperture formed to define a closed high temperature, high pressure chamber. The opposite and closed end of the bar is provided with a small closed aperture (a "well") into which a thermocouple can be inserted. The closed end of the vessel is inserted into an oven, preferably heated by standard nickel chrome electrical elements and having a heavily insulated exterior. That portion of the vessel within the oven is covered with a dielectric and closely fitting external fused quartz cylindrical tube having a dimension sufficient to accommodate both thermal expansion and reasonable amounts of inevitable pressure induced creep in the vessel.

As inserted into the oven, the closed end of the vessel is supported by the surrounding fused quartz tube. A thermocouple for the monitoring of chamber temperature extends into the "well." The portion of the vessel remote from the oven protrudes from the oven and because of the low thermal conductivity of the disclosed metallic bar is cool to the touch, although its opposite end is heated up to temperatures in the range of 1000° C. Therefore, standard fittings for the supply of a high pressure gas, such as oxygen, can be used having high resistance to the chemical action of reactive high pressure gases such as oxygen. Also, the cool end of the vessel is clamped in a rigid support to support the vessel concentric with the furnace.

Samples are conveniently inserted by and within the inside of the aperture of the metallic vessel, the sample being inserted through the standard fittings and passed along the axis into the high pressure, high temperature closed end of the vessel. The sample is preferably wrapped in gold foil to permit ease of removal from the interior end of the vessel. Alternatively, the sample is placed in a refractory ceramic boat which is placed in the furnace. A ceramic rod occupies the void portion of the vessel to reduce oxygen volume. Once placed within the oven and sealed, samples can be heated from temperatures of 500° C. to at least 1000° C. in oxygen having pressures ranging up to 6000 psi.

The metallic bar constituting the pressure vessel in the oven undergoes gradual creep proportional to the pressure used, the gradual creep being a characteristic of the alloy utilized. This gradual creep while limiting the life of the oven dependent upon the pressures used, has the advantage of distributing generated hoop stresses throughout the wall thickness of the high temperature, high pressure chamber by the pressure induced creep. This distribution of stress causes the entirety of the bar to receive the pressure induced hoop stress and slows down the creep in the metal walls adjacent the pressure chamber to a rate which imparts a commercially acceptable life to the oven.

The alloy also does not form metallic phases that cause the metal of the oven chamber to become brittle or otherwise lose the necessary strength to resist both the temperature and pressure. It will be understood that a brittle oven chamber containing high temperature and high pressure oxygen is dangerous, especially when it is repeatedly heated and cooled which causes thermal stress.

The alloy also has low thermal conductivity. Accordingly, one end of the oven chamber can be heated up to 1000° C. while the opposite end of the chamber is warm to the touch. Consequently, ordinary pressure fittings having resistance to chemical action with the contained high pressure oxygen can be used at the "open" end of the oven chamber for the introduction of oxygen.

The fused quartz, surrounding the vessel within the oven, has the advantage of permitting the ready penetration of heating infrared rays at temperatures above 600 to 700° C. and therefore readily transfers heat. Upon completion of treatment, the sample is withdrawn from the oven. The sample is ejected wrapped in the gold foil. The dielectric fused quartz cylinder surrounding the bar monitors the life of the cylindrical pressure vessel against the stress induced creep and signals the end of oven life by telltale cracking and also separates the surrounding heating elements and prevents short circuits.

A composite metal pressure vessel having improved resistance against creep is disclosed. According to this aspect, the vessel is constructed of three layers of material. The respective inner and outer layers of the vessel are of the disclosed alloy, which alloy is subject to the regular creep when under high temperature and pressure. The medial layer of the vessel is a material—such as titanium alloy or cobalt and tungsten containing alloy (such as Haynes Alloy No. 188) for examples—which, although brittle and subject to corrosion and oxidation at high temperature, has a relatively high tensile strength. This sandwich of the high tensile strength intermediate layer enables the composite vessel to have reduced creep while maintaining the necessary resistance to corrosion required in the high temperature, high pressure oxygen environment.

The composite metal pressure vessel is resistant to rupturing during operation. Specifically, and if during the creep of the inner and outer alloy portions of the metal, the intermediate creep resistant but brittle layer fractures, the remainder of the vessel will not catastrophically rupture. Failure of the remainder of the vessel will occur in an accelerated creep which will terminate in tearing open of the composite construction. As a result, the high temperature, high pressure contents of the oxygen furnace will be safely released.

A containment enclosure for the high temperature oxygen furnace is disclosed which together with gas fittings and electrical circuitry contains the furnace against the threat of explosion and inhibits furnace operation until full safety enclosure of the furnace occurs. According to this aspect of the invention, a casing with a hinged upper cover is disclosed for containment. The furnace vessel is enclosed within the containment enclosure during operation. Closure of the cover with resulting complete containment of the furnace is required for system operation and the cover is not operable during operation.

Also disclosed is a manner of containment of the high temperature, high pressure furnace vessel within the containment enclosure casing. According to this aspect of the invention, the pressure vessel includes at either end extension cylinders. These extension cylinders protrude from the respective ends of the oxygen furnace into abutment with the containment casing walls. In event of an accident resulting in the explosion of the high pressure, high temperature oxygen content of the oven, the respective ends of the oven vessel cannot become projectiles. These respective ends are maintained against acquiring projectile momentum and held essentially stationary by the immediately confining end walls of the containment casing.

According to one aspect, the disclosed containment enclosure is essentially a steel construction lined with a "bullet proof" or shock absorbent material such a Lexan, a product of the General Electric Corporation of Schnechtdy, N.Y. This enclosure is in turn lined in the interior with copper to resist burning in case of fire. A separate and shielded lower compartment contained within the casing encloses the necessary electronics for isolation from the oven.

Further disclosed are safety circuits for maintaining the containment casing locked in the closed position during operation of the oven. A first portion of the safety circuits monitor temperature, the combination of temperature and pressure, and pressure alone. Temperature is monitored from a thermocouple independent of the main temperature controller against overheating.

A second portion of the safety circuits monitors both temperature and pressure combined. Specifically, as pressure increases—and the resistance of the pressure vessel to the combined forces of heat and pressure decreases —the preset temperature limit is lowered. This lowering of the present temperature limit maintains the oven within a safe operating envelope of the vessel at all specified ranges of temperature and pressure for the disclosed oven.

A third portion of the safety circuit effects the locking of the oven when either gas pressure is applied, heat is applied or both gas pressure and heat are applied. Provision is made for the initial application of gas pressure while the enclosure is still open and the oven is in the unheated state to enable leak testing of the pressure vessel and attached oxygen or gas lines.

An apparatus for permitting the rapid cooling of the disclosed oven is also provided. According to this aspect of the invention, the heating elements for the pressure vessel are enclosed within mating half cylindrical segments, these segments including insulation and embedded heating elements for defining a cylindrical volume for receiving and heating the oven. After functioning to heat the pressure vessel in the oven for an appropriate period, the respective half cylindrical segments can move from a closed position immediately about the pressure vessel to an open position removed from the oven. In this open position removed from oven, rapid cooling return of the oven to ambient temperature can occur within the otherwise closed containment casing. The cooling can be enhanced by forced circulation of air past the open oven segments using a disclosed fan.

Also provided with the disclosed oven is a resistivity monitor probe for monitoring the conductivity of a sample undergoing high pressure, high temperature oxygen treatment within the oven. According to this aspect, provision is made to provide a ceramic tube or rod with four or more holes penetrating the full length of the oven bore. This rod is provided with metallic wires which contact the sample and which pass through the ceramic tube/rod to the cold end of the vessel. The wires exit the vessel through a pressure seal. A "four point" resistivity measuring circuit for measurement of the resistance changes of the sample undergoing high pressure, high temperature oxygen treatment is provided. A sample for treatment is mounted to the distal end of the probe. Measurement of conductivity within the sample as a function of pressure, temperature and treatment time may all be obtained to enable complete understanding of the phase diagram of compounds such as superconductors being treated within the oven.

BRIEF DESCRIPTION OF THE DRAWINGS

Other objects, features, and advantages of this invention will be more apparent after referring to the following specification and attached drawings in which:

FIG. 6A is a side elevation of the probe within the pressure vessel illustrating the sample undergoing treatment at the end of the probe with a four wire conductor embedded within the probe connecting the sample to resistance measurement equipment;

FIG. 6B is a cross sectional end view of the probe illustrated in FIG. 6A;

FIG. 6C is a schematic diagram illustrating an array of resistance measuring probe for measuring resistivity during treatment of the sample;

DETAILED DESCRIPTION OF THE PREFERRED EMBODIMENT

This invention consists of an externally heated pressure vessel (pressure vessel inserted inside the furnace) made of a strong, non-hardening, heat and pressure resistant alloy. A suitable alloy is Haynes Alloy No. 230, which is specified to withstand stress at high temperatures in air. However no specifications are given under conditions of exposure to concentrated (high pressure) oxygen at high temperatures. I have found that this material can in fact withstand such conditions. Haynes Alloy No. 230 is composed of ($\sim$55% Ni, 22% Cr, 14% W, 2% Mo, 3% Fe (max), 5% Co (max). Tungsten and molybdenum content gives this material excellent strength and long term thermal stability (low creep).

Figure 1:
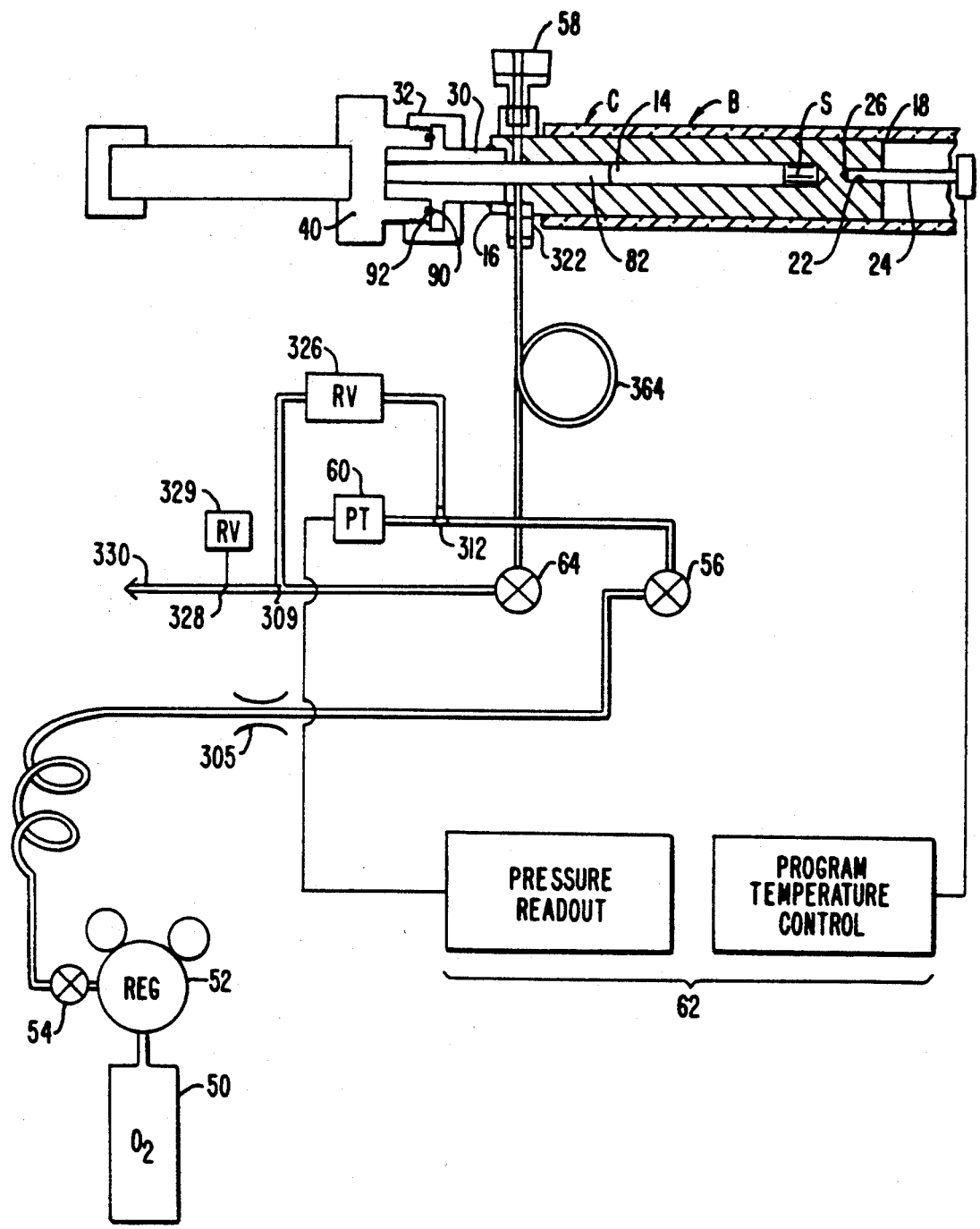
FIG. 1 is a schematic illustrating the hybrid internal high pressure, high temperature oxygen oven inserted to an electric oven at the high temperature end and connected to a high pressure oxygen source at the opposite and cool end.

Referring to FIG. 1 a description of the overall system can be made. The vessel or bar B is illustrated having a concentric bore 14. Bore 14 is a machined at one end 16 of the bar B and continued to and is terminated at a closed end 18 of the bar B. Bore 14 is in the order of 4/10ths of an inch in diameter but may be smaller ($\frac{1}{4}$ inch dia.) or larger ($\frac{1}{2}$", $\frac{5}{8}$", $\frac{3}{4}$" etc dia.). The bar is approximately 17–22 inches long with the bore being in the order of 16–21 inches deep.

The sample S is placed within the bore 14 adjacent the end 18 of the bar. The bar is in turn placed within a furnace F (see FIG. 4) having heating elements (not shown) connected to an electric power source (not shown). Furnace F contains high levels of insulation and has an opening to permit the bar to be inserted into and exposed to the high heat generated therein.

Preferably there is bored a bore 22 in the end 18 of the bar. Into this bore 22 there is placed a probe 24 having a thermocouple 26 at the end thereof. Bar B is supported within the oven away from the heating element by mounting at B near end 16, by support by the insulation, or by both.

A fused quartz cylinder C circumscribes the circular B as it extends within the furnace F. This cylinder C has clearance on the outside of the bar B sufficient to permit normal thermal expansion and creep within the metal to occur. Once creep proceeds beyond the inside dimension of the quartz cylinder C, telltale cracking of the cylinder C will indicate the need for the replacement of the bar B.

It will be understood that end 18 and the sample S are elevated temperatures in the range of 500° C. to in excess of 1000° C. The opposite end 16 of the bar B remains at ordinary temperatures. Consequently, standard fitting 30 and fitting 32, such as stainless steel fittings, can be utilized. An end plug 40 seals the furnace by a copper washer or by an elastic O-ring.

Oxygen is supplied from a cylinder 50 through a regulator 52 by opening of valves 54, 56. A burst disk safety valve 58 is provided and a pressure readout 60 provides a reading to a control panel at 62. Opening of valve 64 serves to bleed high pressure oxygen to atmosphere after treatment of the sample S.

Figure 2:
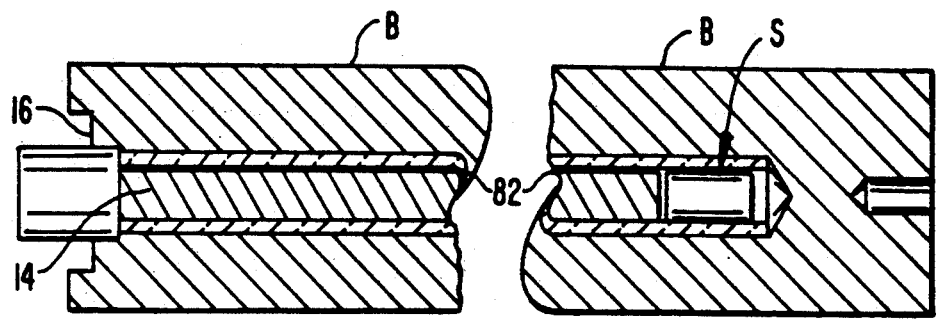
FIG. 2 is a detail of the machined metallic chamber used for the high pressure, high temperature oxygen treatment.

Referring to FIG. 2 our pressure vessel is a thick walled vessel made by boring a hole through a 20 inch length of 1¼ bar of my special metal described above. It has been found that it is feasible to do this by the method of gun drilling approximately 19 inch of the length of the bar. One end of the vessel is outside the furnace and remains cool, so standard fillings can be used. These can be of 316 stainless steel. The fillings can be sealed with copper washers. These do not burn or react with high pressure oxygen in the case of seal leakage. I have found that standard O-ring seals of neoprene or Kel-F can also be used, the hot oxygen being cooled by exposure and by contact with the cool interior of vessel B near end 16 before passing across the O-ring.

Referring further to FIG. 1 the interior of the oven construction can be understood. Sample S is wrapped in gold foil (hereinafter explained with respect to FIGS. 3A and 3B). A portion of the vessel B not occupied by sample S is filled with a ceramic rod 82. A standard fitting 30 is utilized to have an end plug 40 screwed into and close the opposite end of the bar. End plug 40 is preferably provided with an indentation 90 exposed to the chamber having a Kel-F O-ring gasket 92.

Figure 3A:
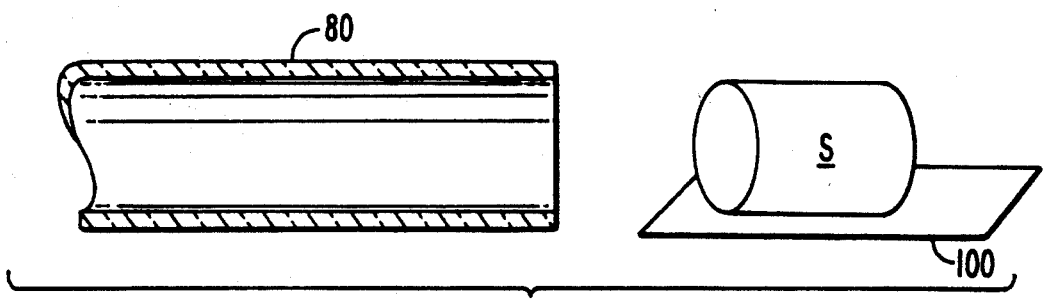
FIGS. 3A-3B illustrate the respective preparation of a sample for insertion into the vessel of the invention (FIG. 3A), placement of the sample and vessel with space occupying rod just before insertion to the oven chamber (FIG. 3B)
Figure 3B:
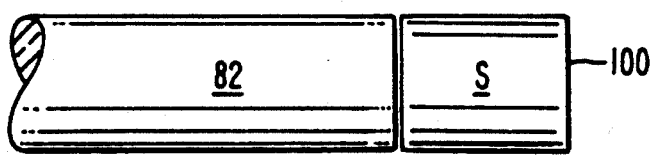

The cartoon series of FIGS. 3A and 3B show the preparation of a sample for insertion to the oven and the subsequent withdrawal of the sample.

As shown in FIG. 3A, a sample S is ready to be wrapped in gold foil 100 in preparation of placement interior of bore 14 of cylinder B. In FIG. 3B, sample S, covered with the gold foil 100, is inserted interior of the vessel. The internal volume of the vessel B is occupied by a ceramic rod 82 leaving only sufficient interstitial area interior of the oven for the high pressure oxygen to find its way interior to the sample. Rod 82 need not fill the entire internal volume of vessel B not occupied by the sample, but should fill at least that portion of the vessel that is exterior the oven. Then the oxygen cannot move from the heated region and pressure buildup will be maximum. Thus $O_2$ pressures several times higher than the cylinder pressure can be applied to the sample.

It will be understood that quartz is particularly advantageous in the exterior cylinder C. Simply stated, at temperatures above 600° C., the quartz is largely transparent to infrared radiation required to heat the sample S. This being the case, total thermal lag of the sample S relative to the furnace due to the presence of the quartz is in the range of 30° C. or less. Another advantage is the very small thermal expansion of the fused quartz.

I have taken certain steps to minimize safety hazards, which would arise from possible leaks in the system. These hazards stem from the presence of hot oxygen at a high pressure.

1) The volume of oxygen in the system is minimized by reducing the inside diameter and length of the high pressure vessel.

2) The quantity of oxygen can also be further reduced by filling part of the inside space with rod 82. Other inert materials could as well be used. Nearly all of the interior of the vessel can be so filled, except for the sample space near the center of the furnace.

Figure 4:
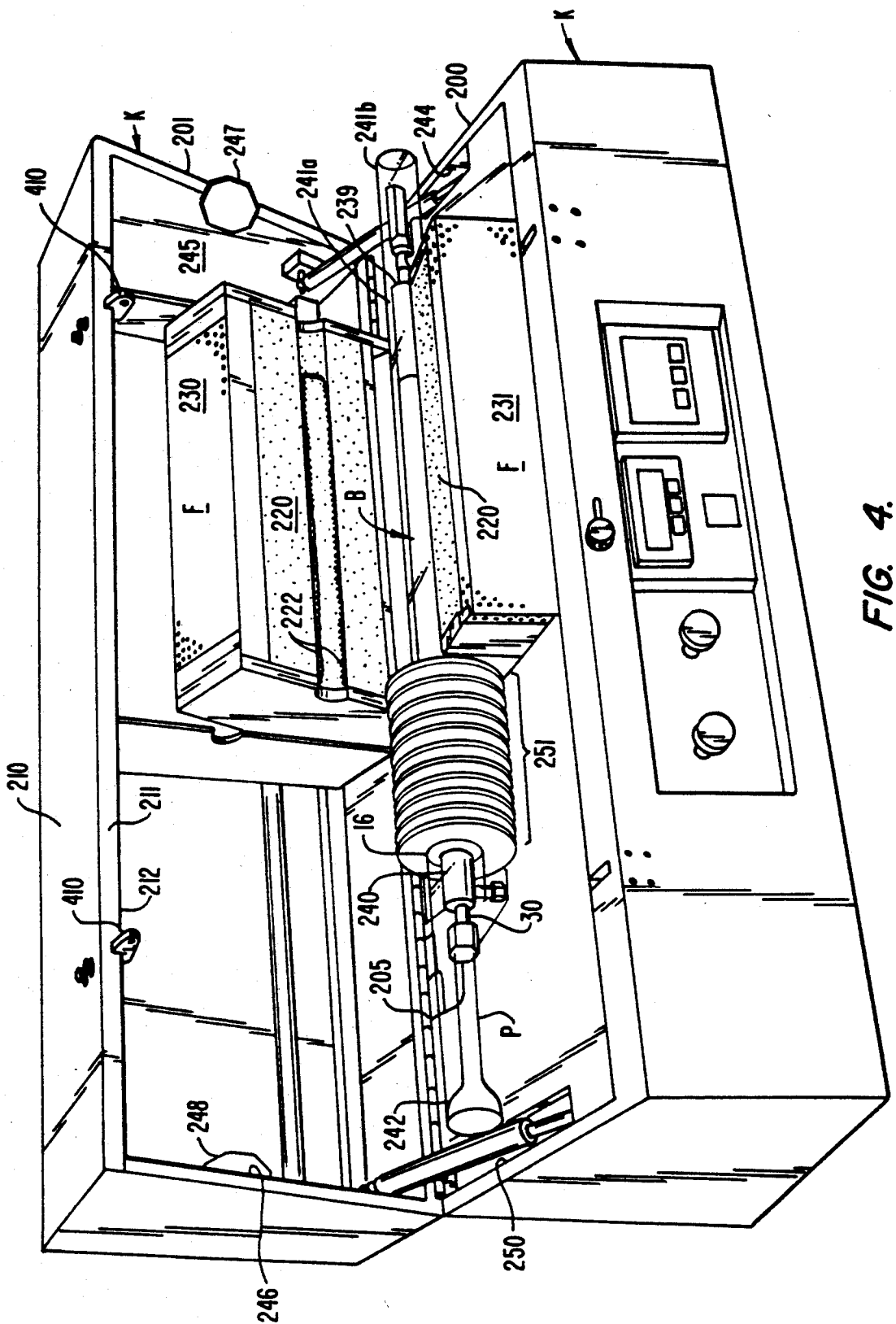
FIG. 4 is a perspective view of the containment casing with the oven halves rotated to the open position for the purpose of exposing the oven pressure vessel, the view here illustrating the cylinders between the ends of the containment casing and the oven pressure vessel for the prevention of projectile like motion of the pressure vessel ends in the event of an oven casualty.

According to this invention, the heated end of the vessel extends beyond the center line of the furnace close to the end 239 of FIG. 4. The sample also is positioned closer to end 239. This is necessary because heat flows more readily along the bar from its hottest end 18 to its cool end 16 outside the furnace than it flows from end 18 through the air space to the other end 241a of the furnace. Therefore, when the vessel B projects beyond the center of the furnace, the sample will be at the position of maximum temperature and minimal temperature variation along the axis.

3) All connecting tubing are made of metals which have very low heat of combustion such as copper or Monel (nickel alloy), etc. and thus will not sustain combustion in case of a leak of hot oxygen.

4) The effects of a possible leak are minimized by using very small bore high pressure connecting tubing, which restricts the rate of gas flow. In case of a valve or fitting leak the gas will escape at a safe low rate.

5) The wall of the pressure vessel is very thick in comparison to the bore hole size. The standard pressure rating (given on page III.P-13, "Rules & Procedures for the Design & Operation of Hazardous Research Equipment", Pub. 3001, Lawrence Berkeley Laboratory, University of California) is:

$$P = S(r_o^2 - r_i^2)/(r_o^2 + r_i^2) \qquad \text{Equation 1}$$

For the diameters given in FIG. 1:
$r_o = D/2 = 32 \text{ mm}/2 = 16 \text{ mm}$ $r_i = d/2 = 10 \text{ mm}/2 = 5 \text{ mm}$ thus,
$$P = 0.8 \, S \qquad \text{Equation 2}$$

where $r_o$=the outer radius, $r_i$=the inner radius and S=the hoop (is azimuthal) stress in the material (S is highest near the inner diameter of the vessel).

The above is the appropriate calculation for a perfectly elastic material, and this formula must be used if the material is hard or is embrittled by heat treatment before or during use.

However, the material used according to my invention is not subject to hardening or embrittlement. Rather, it is subject to "creep" (i.e. slow, continuous, irreversible elongation under stress at high temperature). The creep is very slow at low stress, but the creep increases rapidly with increasing stress.

According to my invention, when the vessel is filled with high pressure gas and then heated, rapid creep will begin near the inner diameter where the hoop stress is then highest. Then, as the material creeps, the stress near the inner diameter will be reduced and the stress will redistribute itself throughout the entire thickness of the pressure wall. Finally, the stress will be uniform so that the entire wall will expand very slowly and uniformly.

The material stress will thus be reduced and the creep life for stretching and expansion of the vessel (or equivalent of the allowable pressure for a given life) will be increased. The applicable pressure rating in this circumstance is based on the formula for a thin walled vessel (given on page III.P.-12, "Rules & Procedures for the Design & Operation of Hazardous Research Equipment", Pub. 3001, Lawrence Berkeley Laboratory, University of California). The formula is:

$$P = ESt/r_m \quad \text{Equation 3}$$

where $E=1$ for a single solid vessel with no joints, $t=$ the wall thickness and $r_m=$ the mean radius.

This formula must be integrated from the inner diameter to the outer diameter of the pressure vessel wall, with the result:

$$P = \int_{r_i}^{r_o} S dr/r_m = S \int_{r_i}^{r_o} dr/r = S[\ln(r_o) - \ln(r_i)] \quad \text{Equation 4}$$

In our example $r_o = 16$ mm and $r_i = 5$ mm, then
$$P = 1.16 \, S \quad \text{Equation 5}$$

This is higher by the factor $1.45 = 1.16/0.8$ (Equation 5/Equation 2) than the previous pressure calculation (Equation 2). For thicker walled containers this result is even more favorable, e.g. for $r_o = 5r_i$, $P = 1.61 \, S$.

Taking the example of a specific material, Haynes Alloy No. 230, the ultimate tensile strength is 32,000 psi at 982° C. (and 17,300 psi at 1093° C.) (page 6, Haynes Alloy No. 230 booklet), but the stress for 1% creep in 1000 hours at 982° C. is only 2000 psi (see page 5 of the same booklet).

Then, according to Equation 2, the pressure rating would be $P = 0.8 \, S = 0.8 \times 2000$ psi $= 1600$ psi. But using Equation 5, the rating is:

$$P = 1.16 \, S = 1.16 \times 2000 \, psi = 2320 \, psi$$

[and with a thicker wall $(r_o = 5r_i)$: $P = 1.61 \, S = 1.61 \times 2000$ psi $= 3200$ psi]

Thus, with the dimensions of our example (outer diameter = 32 mm, inner diameter = 10 mm), we find a substantial improvement (50%) in the pressure ratings over Equation 2.

Consider another alloy, Haynes Alloy No. 188, a cobalt based alloy ($\sim 38\%$ Co, 22% Ni, 22% Cr, 14% W, etc.), which has ultimate tensile strengths 35,200 psi at 980° C. and 18,700 psi at 1093° C., again far in excess of the pressure limits determined by creep. According to the creep specifications given on page 9 of Haynes Alloy No. 188, creep strength at 980° D is 2100 psi for 1000 hour service life with total creep of 1%. Applying Equation 5 to a vessel with dimensions of our example (32 mm outer diameter and 10 mm inner diameter) we find pressure ratings of 2400 psi against only 1680 psi from Equation 2. This alloy is unsuitable in high pressure $O_2$ because Cobalt Tungstate (an Oxide) forms, and oxidation penetrates into the material.

A third high temperature nickel based heat resistant alloy is Haynes Alloy 214 with $\sim 76\%$ Ni, 16% Cr, 4.5% Al, 3% Fe. This alloy has much higher ultimate strength at 760° C. than Alloy No. 230 or Alloy No. 188 (page 14 of Haynes Alloy No. 214 booklet). However, stress for 1% creep in 1000 hours is only 800 psi at 982° C. (1000° F.) (see graph on page 18 of Haynes Alloy No. 214 booklet). This lower creep rating is because this alloy lacks tungsten and molybdenum which is present in the other two. Haynes Alloy No. 214 is claimed to have "superior resistance to oxidation attack attributed to a tenacious and protective $Al_2O_3$ type film which is modified by a small but effective amount of yttrium" (page 2 of Haynes Alloy No. 214 booklet). Furthermore, this alloy is "precipitation-strengthened" because of the formation of $Ni_3Al$ (gamma prime) (see page 14 of Haynes Alloy No. 214 booklet). It becomes hardened and embrittled if held in the temperature range 595° C.-955° C. (page 19 of Haynes Alloy No. 214 booklet). Even if the furnace is heated above 955° C., part of the pressure vessel will be at a lower (dangerous) temperature. Thus the type of material, although suitable at temperatures below 760° C., is totally unsuitable (and in fact unsafe), at higher temperatures.

Having set forth the various metallic compounds we have worked with it can be said that the Haynes 230 alloy of the disclosed composition is definitely preferred.

Regarding this alloy, we have learned that it advantageously has a large nickel base exceeding 45%. This nickel when exposed to the high temperature of the oven turns black and forms an ideal infrared heat absorbing body. Additionally, the nickel is ideal for resisting chemical attack under high temperature.

The chromium provides protection against oxygen attack. At least a 15% concentration of chromium is recommended.

Tungsten and molybdenum in the alloy gives preferred reduction to creep. Quantities of tungsten in excess of 10% and molybdenum up to about 3% are required. Moreover, molybdenum can partially replace tungsten.

The remaining elements must be chosen carefully. For example, in the preferred embodiment, iron and cobalt are held to respective 3% and 5% maximums. Cobalt can form an undesired alloy if present in larger amounts.

As has been previously set forth, it is highly desirable that the alloy have the creep properties set forth for the distribution of the inevitably induced hoop stresses. Preferably, the creep properties should occur in a single metallic phase of the metal and should be sufficiently gradual to provide an acceptable in service life. Such creep properties enable stress redistribution in the oven chamber to impart increased in service life.

Referring to FIG. 4, a commercial embodiment of the invention described is set forth. Specifically, a containment casing K is illustrated having a lower portion 200 in an upper portion 201. The casing is hinged along a continuous hinge 205 which hinge is capable of withstanding and holding the case in the closed disposition against possible explosive forces anticipated interior of the case. The case includes an exterior steel surface 210 and an interior surface including a Lexan layer 211 and an interior copper lining 212. As is well known to those having skill in the art, the steel external casing 210 provides strength. The Lexan at 211 provides the necessary impact resistance. Finally, the inner copper lining 212 protects the casing against oxygen fueled fires.

The pressure vessel B is contained internally of the casing within a furnace F. Furnace F is shown in the hinged and open position and includes a layer of insulating material 220 with embedded heating elements 222.

In the operation of the furnace the respective furnace sections 230, 231 will be closed. Likewise the respective casing sections 200, 201 will also be closed. Thereafter, the furnace will be heated. High pressure oxygen may be communicated to the pressure vessel B either before or after the furnace sections and containment casing sections are closed. Supplying of oxygen pressure to the vessel before closure of the furnace section and casing sections permits leak testing before sealing of the oven for operation.

In the disclosed oxygen furnace, great care has been taken to guard against the adverse effects of a high pressure oxygen explosion of the ingredients of the sample being treated in the high pressure, high temperature oxygen atmosphere. It is to be understood that the creeping alloy construction of pressure vessel B will permit rupture of the sidewalls of the vessel B to occur in a tearing fashion with the ultimate release of gas to the closed interior of the casing K. It is possible, however, that explosion could occur to the respect ends 239, 240 of the pressure vessel.

In the case of an explosion in the interior of the vessel B, the reader will realize that the disclosed aperture can act much in the order of a rifle or gun barrel. Specifically, either the entire vessel could recoil towards end wall 245 of case K or the interior contents of the bore could be expelled outwardly and onto end wall 246 at the opposite end of the casing. In either event, such an explosion would result in projectile like particles passing along the axis of the bore of vessel B, reaching ballistic velocities where their impact on the respective ends of the casing 245, 246 could cause considerable penetration.

To prevent this ballistic type accident, and between the respective ends of the vessel B and the respective walls 245, 246 I install cylinder segments 241a and 241b, and 242. These respective cylinders segments have the advantage of transferring the force of the explosion directly to the respective walls 245, 246 and to respective impact plates 247, 248. They prevent particles interior of the vessel B bore from reaching ballistic speeds. This being the case, the end walls need only absorb the force of the explosion; it is not required that they also absorb projectile like momentum accumulated as the result of the explosion. Plate 248 distributes the impact of cylinder 242 to upper and lower end faces 246 and 250, while the impact of 241a is transmitted to 241b and then to plate 247, which distributes the load to upper and lower ends 245 and 249.

The reader will understand that it is desirable to maintain fitting 30 at ends 16 of the pressure vessel B in a cool state. To assist in maintaining this coolness, a re-entrant heat radiator 251 is utilized. Specifically, re-entrant heat radiator 251 fastens at vessel B at ends 16 and serves to radiate heat backwardly to and towards furnace F.

It will be further observed that from the dimension of furnace F that the furnace can be rotated to an open disposition. This open disposition can occur even when the portions 200, 201 of casing K are in the closed position. Specifically, and by enabling such movement, the furnace F segment 230 can move away from the vessel B after heating and pressure oxygen treatment of a sample within the pressure vessel B has occurred. This movement will remove the insulation 220 from surrounding the upper portion of the vessel B and will allow heat of the vessel B to radiate outwardly. Consequently, a more rapid cooling of the vessel B can occur.

In one preferred embodiment of vessel B illustrated in FIG. 4, I no longer use the cylinder C. This preferred embodiment absent cylinder C permits direct measurement of the size of the vessel B and corresponding tracking of the inevitably high temperature stress induced creep which occurs within vessel B. Accordingly, this stress can be tracked and vessel B timely replaced.

Figure 5:
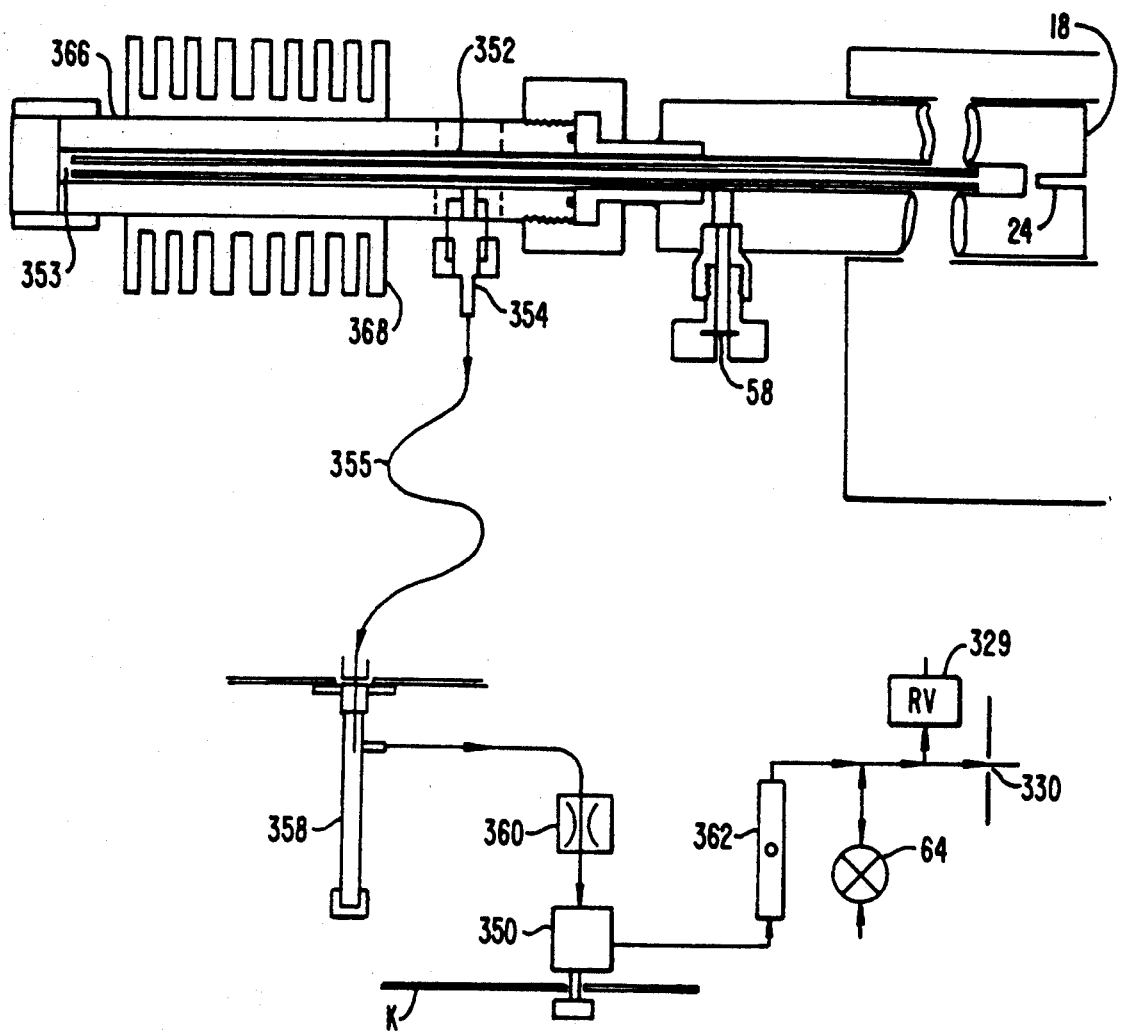
FIG. 5 is a schematic diagram of the pressure vessel illustrating the continuous flow through purge system.

The improved construction of the oxygen supply to the disclosed oven is illustrated in FIG. 1 and in FIG. 5. Specifically, oxygen is supplied from an oxygen cylinder 50. A conventional high pressure regulator 52 is used for setting of pressure. Inlet interior of the instrument occurs at a 30,000 L ohm fluid restrictor 305—which limits flow at 2500 psi to a rate of less 20 liters per minute. Passage of the oxygen tubing goes to a fill valve 56.

Two discrete paths for the oxygen are utilized. One of the paths is for the filling of the oven with oxygen. The remaining path is for releasing oxygen from the oven. The path from valves 56 and 64 to pressure vessel B is circuitous so that discharged oxygen may be cooled before it reaches the discharge valve 64.

Regarding the inlet path, oxygen passed by fill valve 56 passes through tubing tee, past a pressure transducer tee 312. Pressure transducer tee 312 has a pressure transducer (PT) 60 for providing continuous monitoring of pressure all operating states of the oven. It will be observed that the pressure transducer is separated from the oven by a considerable length of tubing 364. This separation is provided so that the pressure transducer and vent valve 64 are not affected by the considerable temperature of the oven. It will be further observed that when oxygen is relieved from the oven, flow occurs along the long tube and then to vent valve 64. This path prevents the heat of the oxygen from being communicated to the pressure transducer and to vent valve 64 because the gas is cooled while passing through tubing 364.

After passage from valve 56 and the pressure transducer 60, oxygen flows through tube 364 and into the oven at fitting 322.

It will be observed that two separate high pressure safety valves are communicated to the oven. One such safety value is burst disk safety 58. This safety provides for immediate and direct pressure relief when the design operating pressure of the oven is exceeded. For operating purposes, this pressure is set at a pressure exceeding the operating pressure limit e.g. 10,000 psi. The purpose of this safety is for high volume release of gas—as where an explosion interior of the oven occurs.

A second safety 326 is communicated to the tee 312. This safety 326 is set at a pressure below that of burst disk safety 58. This safety 326 provides for the gradual release of pressure upon reaching the operating limit. Released oxygen passes through a tubing tee connector 328 to a three pound safety 329 and also out of the instrument at aperture 330. Three pound safety 329 is on the line to enable gas discharge interior of the housing in the unlikely event that aperture 330 should become plugged.

Having described the oxygen inlet and attached safety valve system, attention will now be directed to the oxygen outlet.

Conventional oxygen outlet occurs through a vent valve 64. Vent valve 64 receives oxygen from tube 364 and discharges the oxygen through safety 329 or aperture 330, or both. This discharge path is utilized for the discharge of oxygen in the non heated state.

Provision is made for the continuous circulation of oxygen. This continuous circulation of oxygen is utilized where gaseous by-products must be continuously removed from the oven during processing.

As shown in FIG. 5, a metering valve 350, mounted on the front panel of the containment casing K of FIG. 4, communicates with the oven along an alternate flow path. This flow path begins at a ceramic tube 352 that is penetrating the interior of the oven in the vicinity of the sample S. Gas flows from the oven into tube 352, out to its opposite end 353, then back along the outside of tube 352 through orifice 354 via line 355 to condensate trap 358, and through flow restrictor 360. Flow restrictor 360 functions to limit flow to a rate where heat discharge will be 60 watts or less from the heated gasses interior of the oven. Flow from valve 350 to the exterior of the furnace apparatus includes passage through a flow indicator 362 and finally, to safety 329 with discharge at aperture 330.

It will be understood that the metering valve provides for the continuous circulation of oxygen. Specifically, the pressure desired to be maintained can be set at regulator 52 (see FIG. 1). The inlet valve 56 remains open. Thereafter, metering valve 350 can be adjusted to obtain a desired flow through rate within the oven as indicated at flow indicator 362. Continuous flow can be maintained during oven operation.

Further connected to the orifice assembly is a concentric tube heat exchanger 366. An optional set of cooling fins 368 may be fitted to the heat exchanger to facilitate the cooling of the gas before exiting the vessel.

Referring to FIGS. 4, 6A-6B, the reader will understand that this invention has an additional advantage. Specifically, as shown in FIG. 4, a resistance measuring probe P can pass along the axis of the containment casing K and into the vessel B interior of the furnace F. Specifically, this probe, typically fabricated of ceramic, can have mounted at the end thereof sample S which sample S is typically attached to four gold, or silver, or platinum wires.

Referring to FIG. 6A, it is shown that probe P has a plurality of conductors 601, 602, 603 and 604 within channels 607. Conductors 601, 603 are of platinum; conductors 602, 604 are an alloy of platinum and rhodium; alternatively, all four conductors can be platinum, gold, or silver. Where one end of probe P connects with sample S, which is resting in probe end 609. A cross sectional view of the probe end that holds sample S is shown in FIG. 6B. The other end of the probe connects to a terminal block 606. The terminal block is further connected to various output and measurement devices such as a plotter, an ohm meter, a voltmeter, and a computer as shown in FIG. 6C. The terminal block is secured in placed by a cover 611 that mounts on a pressure seal 613. Pressure seal 613 mounts to adaptor 608 and allows the wires to exit the vessel without leaking any oxygen or other gas.

FIG. 6A further shows how O-ring 92 fits with adaptor 608 to prevent gas leakage at the joint. Adaptor 608 has a liner 610 around the inside to protect the probe P from contacting the metal fitting. Vessel adaptor 612 seats in the end of vessel B and is secured in place by a weld 614. Just before the end of the vessel is an orifice 616 that vents to burst disk safety valve 324. A similar orifice has fitting 322 (FIG. 1) welded on to vessel B. Tube 364 is connected to fitting 322.

Six or eight wires may be used to measure temperature, resistivity, Seebeck (thermoelectric $\Delta V/\Delta T$) coefficient and temperature gradient in the sample.

Typically, sample S includes imbedded gold wires 605 as shown in FIG. 6C. These respective gold wires are in turn connected to the platinum conductors. The combination of the platinum conductors and the platinum rhodium enables both the temperature and the resistivity of the sample to be simultaneously measured. Specifically, and for the measure of resistivity, current is provided to two of the conductors. In this mode, resistivity of the sample can be monitored at a micro ohm ($\Omega$) meter 618. Alternatively, the thermocouple bimetallic property of the conductors enables temperature to be determined at micro voltmeter 620, when the current I is switched off. Appropriate outputs to both a chart recorder 622 and a computer 624 (for the analysis of the data) is provided.

For measurement of the Seebeck coefficient, the platinum and platinum rhodium alloy wires are connected to form two thermocouples. The thermocouples are made to contact the sample at two points on the sample along the axis of the vessel. The sample is positioned farther from end 18 than usual, so it is in a temperature gradient. The two thermocouples, when connected in series opposition, give an output (difference) indicating the temperature difference between them. When the connection between the two thermocouples is interrupted, the output is the voltage generated by Seebeck effect in the sample. From the ratio of the two voltages, the Seebeck coefficient can be determined.

Figure 6D:
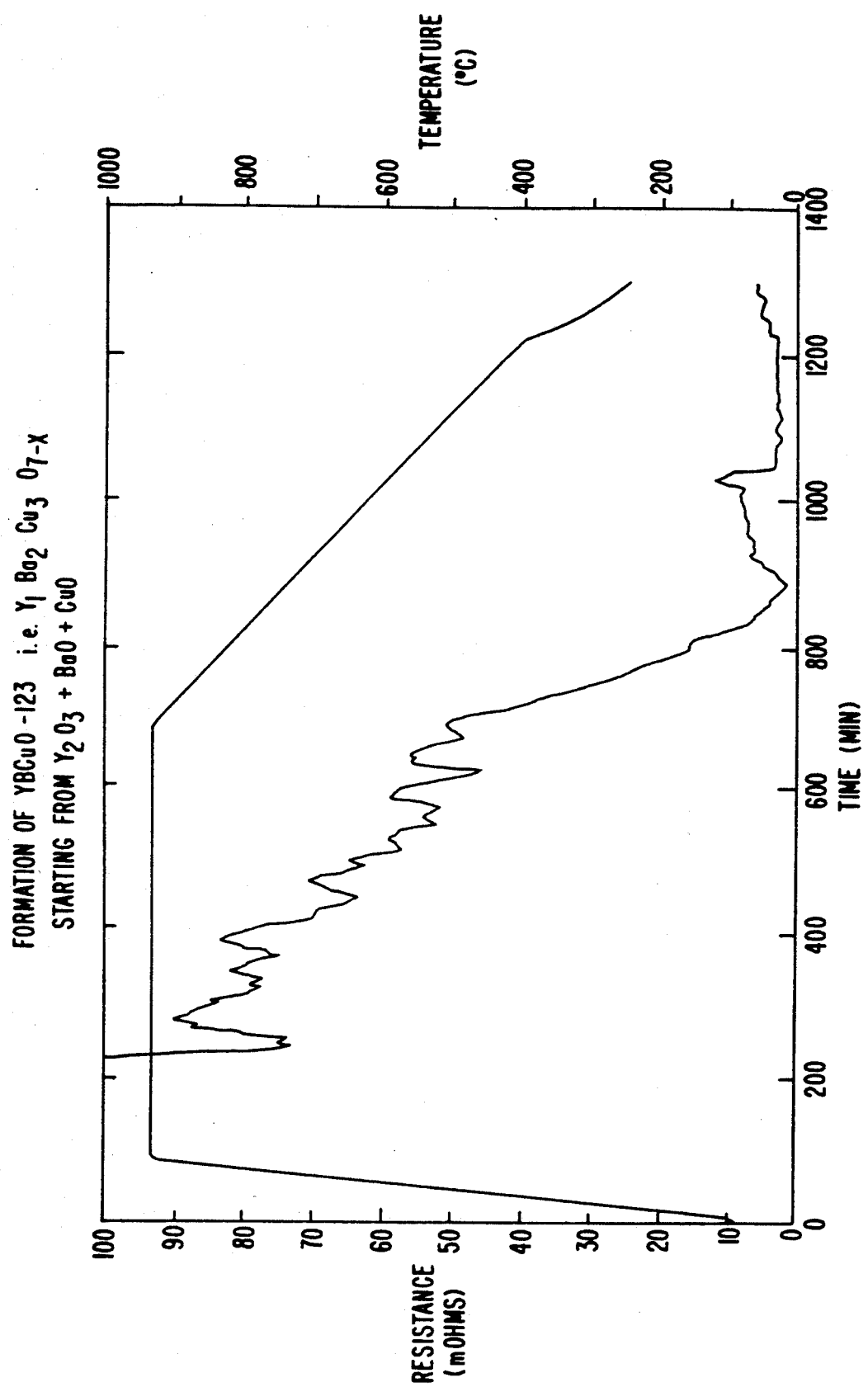
FIG. 6D is a diagram of resistance versus time and temperature illustrating the change of resistivity of a treated sample within the oven.

Referring to FIG. 6D, an actual measurement of resistivity is illustrated. Specifically, the disclosed resistivity is shown measured with respect to time (in minutes) versus resistance (left hand scale). The temperature of the oven versus the time of treatment is plotted with respect to the time and temperature scales (right hand scale).

Those having skill in the art will realize that changes in resistivity may be intimately plotted versus oxygen synthesis pressures. Such plots and changes in resistivity may be used to precisely identify phase boundaries.

Figure 6E:
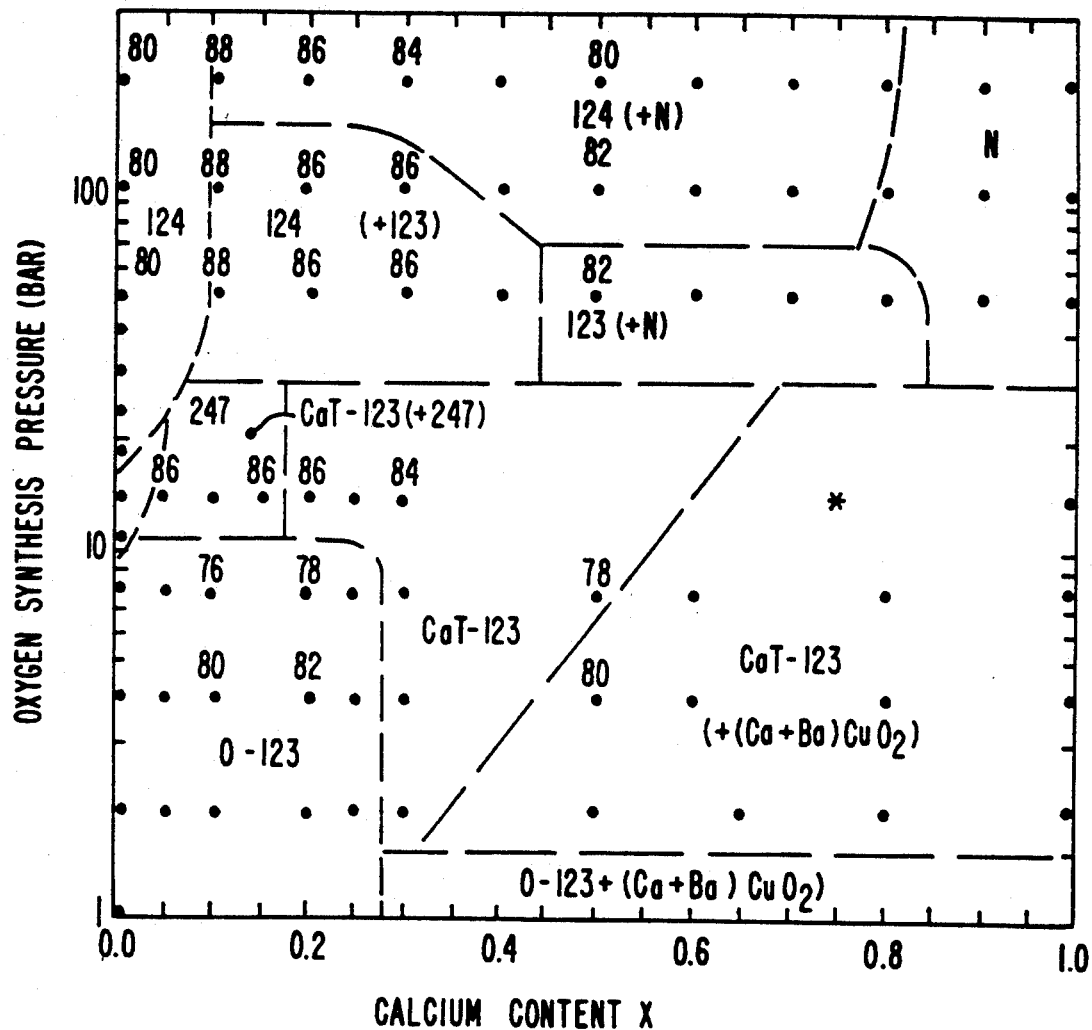
FIG. 6E is a phase diagram of an exemplary super conductor treated within the oven, the probe of FIG. 6A greatly facilitating the determination of the respective phase boundaries.

Referring to FIG. 6E, an oxygen synthesis pressure (in bars) is plotted against calcium content of a calcium/barium cupric oxide compound mixture treated with high pressure oxygen. By the expedient of maintaining the desired calcium content and observing the change of resistivity with changing oxygen pressures, a phase diagram may be rapidly generated. An exemplary diagram is that shown in FIG. 6E.

Figure 7:
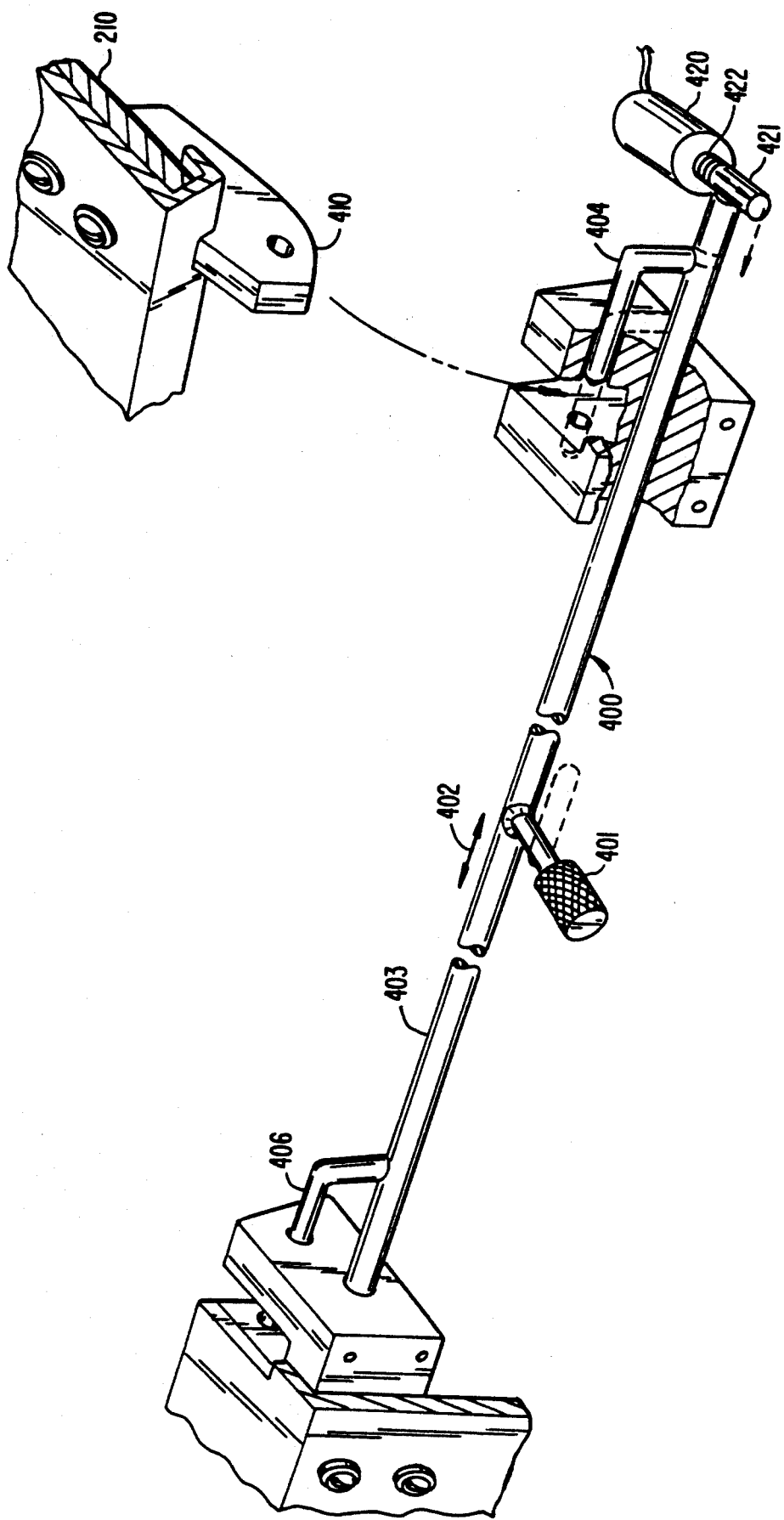
FIG. 7 is a perspective view of the bolt locking device broken away from the containment casing of the enclosed invention.

Referring to FIG. 7, a latch mechanism 400 is illustrated. The mechanism includes a latching handle 401 movable in sliding relation along the direction of arrow 402.

In order to move latch mechanism 400, lock bar 421 must first be withdrawn by solenoid 420. Latch mechanism 400 has a first latch pin 404 on one end and a second latch pin 406 on the opposite end. The respective latch pins 404, 406 serve to capture latch lugs 410 attached to case K at the upper portion 210 (see FIGS. 4 and 7). Once the case is moved to the closed position and the respective lugs 410 are captured within and by the respective latch pins 404, 406, solenoid 420 is deactivated. Spring 422 then moves lock bar 421 attached to the solenoid to the forward position where it blocks the end of rod 403. Lockbar 421 moves between two positions.

In a first position wherein bar 421 is withdrawn interiorly of solenoid 420, and mechanism 400 is moved past the end of lock bar 421, opening of the case freely occurs. In a second position, where bar 403 has moved past latch pins 404, 406 into latch lugs 410 to lock the case, the case is maintained in the locked condition.

Figure 8:
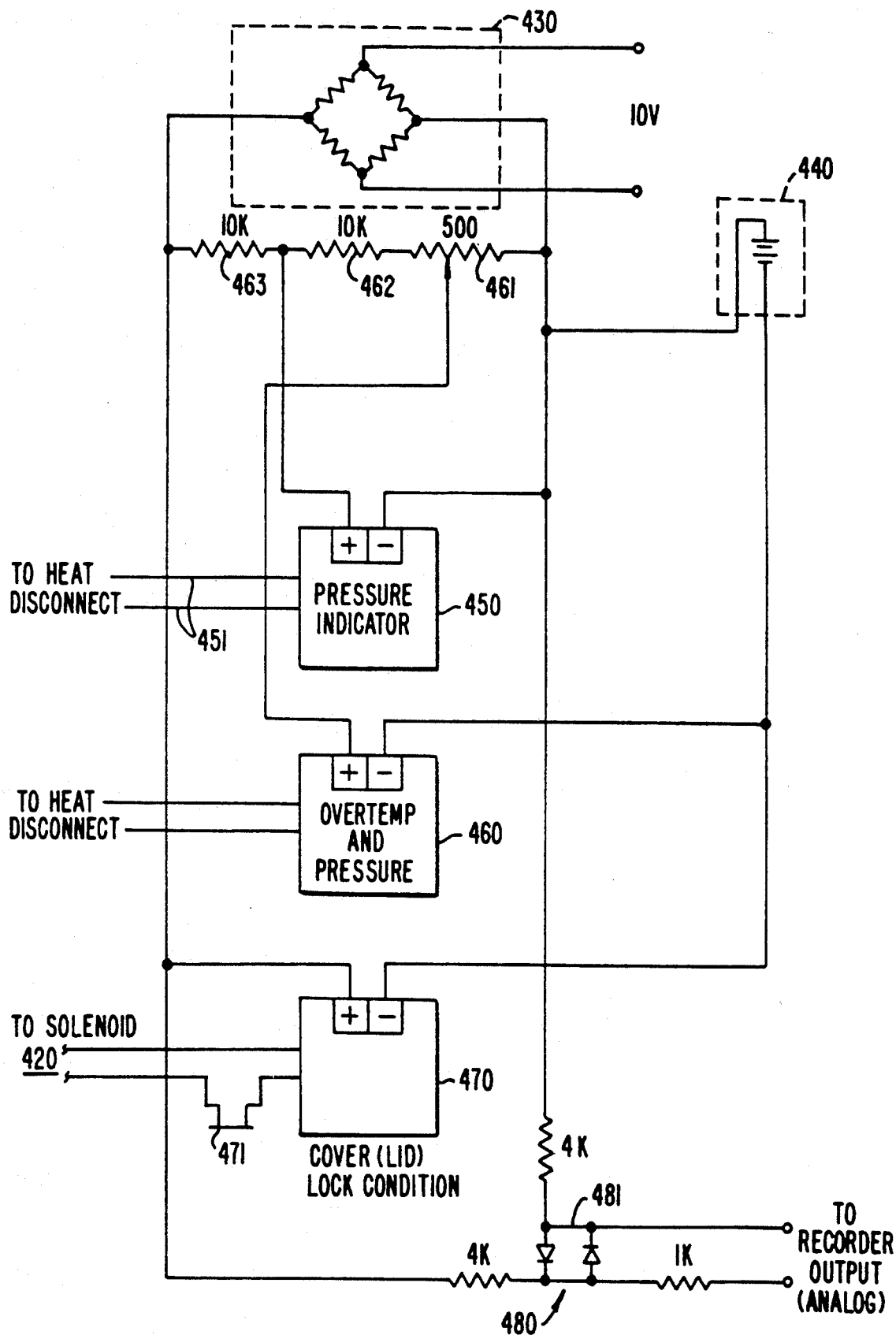
FIG. 8 is an electrical schematic of the safety circuitry utilized with the disclosed high temperature, high pressure oxygen furnace; and, FIG. 9 is a schematic view of a three layer pressure vessel having inner and outer alloy layers with an intermediate high tensile strength layer not subject to rapid plastic deformation under stress at elevated temperature.

Referring to the electrical schematic of FIG. 8, circuitry for the actuation of the solenoid 420 is illustrated. A pressure transducer 430 is illustrated. The transducer may be of the type such as or similar to a Barksdale series 302. Pressure transducer 430 communicates with pressure interior of the chamber of the oven. Likewise, a thermocouple 440 communicates thermally with the oven. As will hereinafter be understood, either temperature, pressure, or a combination of temperature and pressure serves to maintain solenoid 420 in the inactive position.

Regarding pressure alone, the electric potential across the pressure transducer 430 is monitored at a pressure indicator 450. The electrical output from the pressure transducer has input to pressure indicator 450 after passing through voltage dividing network made up of potentiometer 461 and resistors 462 and 463. An electrical signal from the pressure indicator is sent via lines 451 to limit or cut off supply to the heater.

It is necessary to effect limiting of the heat of the oven as a function of a combination of temperature and pressure. According to this aspect of this invention, a divider network including potentiometer 461 and dividing resistors 462, 463, outputs a signal to an oven temperature control 460. The circuit disclosed communicates the signal from the thermocouple with about 1% of the signal from the pressure transducer. This fraction can be adjusted by potentiometer 461. Dependent upon the total temperature plus a relatively small input of pressure signal, the high temperature limit of the furnace is reduced. Specifically, as the pressure increases, the ultimate temperature, which may be attained within the oxygen furnace, is decreased. Such temperature control occurs at an open circuit to the heating elements generated interior of the over-temperature control 460.

Finally, and in a separate circuit a cover lock circuit 470 effects de-actuation of the solenoid 420 to lock the cover in the closed condition. Specifically, and upon sensing either pressure or temperature, or a combination thereof, beyond predetermined limits, solenoid 420 cannot be energized by push button 471 since the supply is interrupted by 470.

It will be understood that pressure as a function of time constitutes useful information. Accordingly, circuitry 480 is provided for outputting pressure information. As is common in the art, shunting diodes 481 are utilized to prevent extraneous input to the control circuits here illustrated.

Referring finally to FIGS. 9A-F, various embodiments of a composite metal pressure vessel B' having improved resistance against creep are disclosed. Pressure vessel B' is composed of three discrete layers. A probe mount cavity 904 is formed in the end of the vessel to receive a probe during operation of the furnace.

The pressure vessel includes respective inner and outer metallic layers 901, 903. These respective layers are of the disclosed alloy which is subject to regular creep when under high temperature and pressure.

The medial layer is a strong metal such as titanium alloy or gamma prime ($Ni_3Al$) alloy, or cobalt tungsten alloy, or the like. Such metals when subjected to high temperatures become brittle. Further, these metals are subject to corrosion in the presence of atmospheric oxygen. However, they have the advantage of relatively high tensile strength.

The disclosed layers of metal enable the high tensile strength of the intermediate layer 902 to enable the composite vessel to have reduced creep. This layer may or may not encircle the end of layer 901 or 903 as shown in the alternative embodiments. At the same time, the respective layers 901, 903 maintain the necessary insulation of the high strength alloy (titanium) layer from atmospheric oxygen to prevent corrosion. The overall vessel is provided with reduced creep to enable use at higher temperatures and with a relatively long oven service life.

Figure 9A:
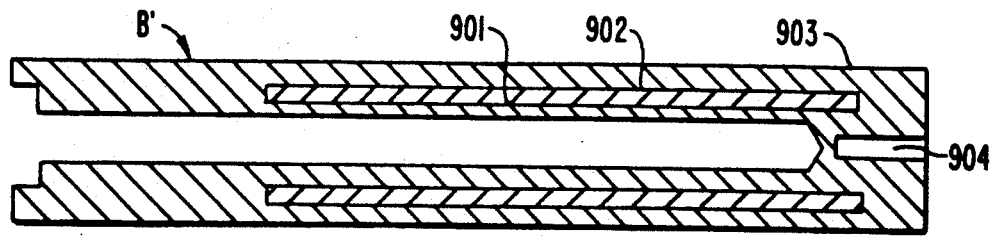

The vessel B' of FIG. 9A demonstrates the use of layers 901 and 903 to reduce creep in the radial direction. The vessel in FIG. 9B incorporates flanges 905 and 906 at opposite ends of layer 902 to reduce creep in the axial direction by locking layer 902 in place. Fitting 30 also is shown welded to end 16.

Figure 9B:
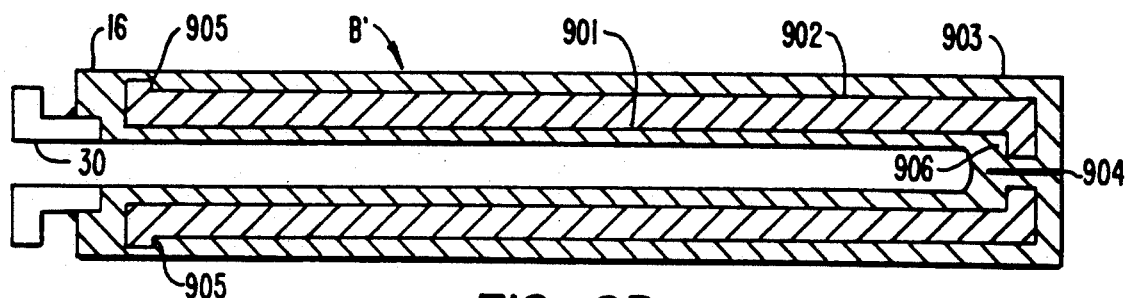
Figure 9C:
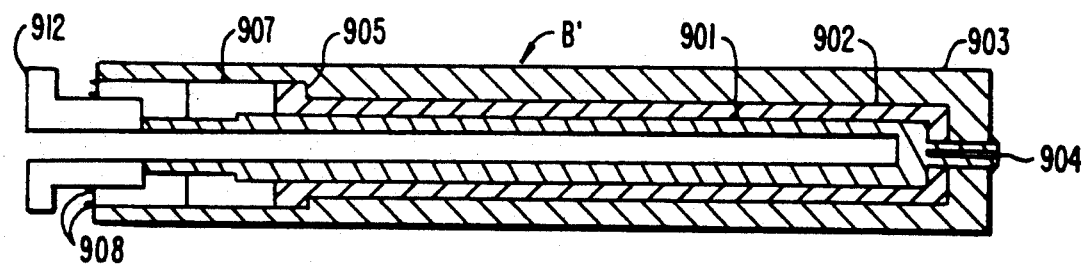

FIG. 9C illustrates a vessel B' that incorporates the interlocking flanges 905 and 906 as in FIG. 9B, except that a metallic brace 907 seats against the end of layer 902, which remains outside of the furnace. Since the brace 907 remains cooler than the end in the furnace, it may be formed of a metal such as stainless steel. The brace is used to seal flange 905 from exposure to oxygen.

Figure 9D:
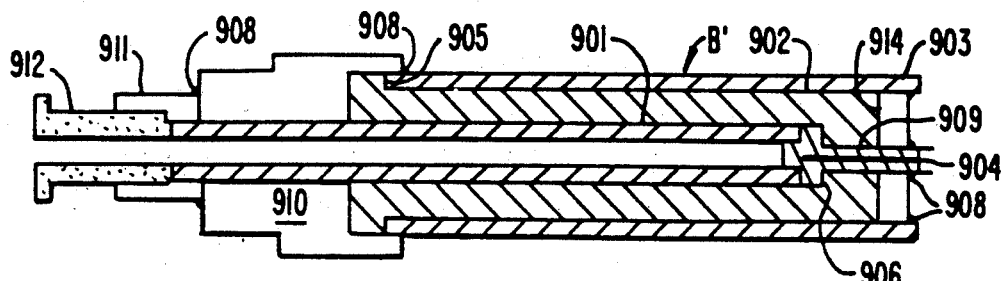

FIG. 9D is yet another variation of vessel B'. This embodiment uses the layer 902 of FIG. 9B with flanges 905 and 906. However, layer 903 does not extend over flange 905 or 906, as previously shown in FIG. 9A. Also, the probe mount cavity 904 is formed in a plug 909 with an enlarged end that is welded to layer 901 and end cap 914. Cap 914 is welded to layer 903 by welds 908. Plug 909 also is formed of the same material used in layers 901 and 903. The other end of vessel B' has a fitting 910 welded to layer 903 to seal layer 902 against exposure to oxygen and to prevent creep in the axial direction. Fitting 910 is designed to be outside the furnace, therefore, it also may be made from the same material as fitting 912. Additional welds 908 are used to secure fitting 910 to layer 901, which extends beyond fitting 910. A coupler 911 is welded to fitting 910 to receive end fitting 912.

Figure 9E:
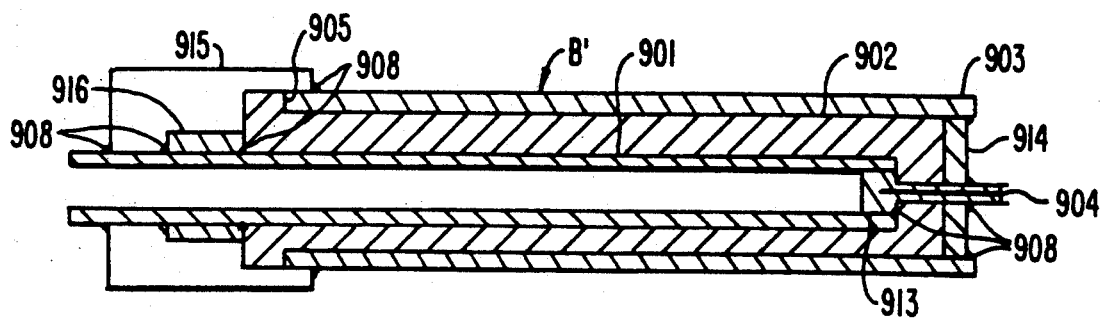
Figure 9F:
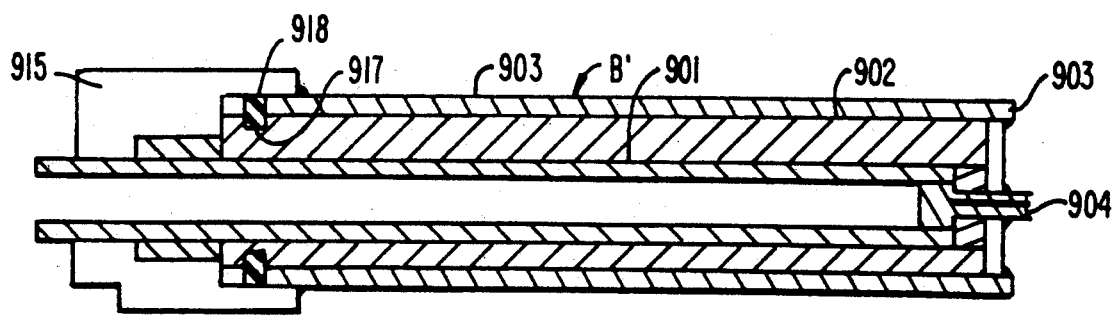

Finally, FIG. 9E shows another embodiment of vessel B'. Again, layer 902 is formed to have flanges 905 and 906. A plug 913 with an enlarged end is welded to layer 901. A end cap 914 is used to seal layer 902 against exposure to oxygen and is held in place with welds 908. Plug 913 is formed of the same material used for layers 901 and 903. At the other end, layer 903 does not close around flange 905 of layer 902, but has a fitting 915 welded to it to protect layer 902. Also, layer 901 extends beyond layer 902 and accepts a concentric ring 916 and fitting 915, both of which are welded or brazed onto layer 901. Ring 916 is made of the same material as layer 901 and 902 or of the same material as fitting 915. Fitting 915 is made of the same material as the other fittings used outside of the furnace. Alternatively, flange 905 is replaced by a grove 917 in which a split ring 918 is placed. FIG. 9F) thus eliminating the need for the flange on 902 to secure it in place.

It should be realized titanium alloys or gamma prime, etc., would be completely unsatisfactory as a metal for the disclosed oven. However, these alloys, when contained within the disclosed layers of creeping metal and insulated from oxidizing, have superior life. The combination of the metals in layers performs with advantages that neither metal alone could possibly provide.

It should also be understood that the layers subject to creep at 901, 903 add high resistance of the vessel to rupture. Specifically, and if during creep of the inner and outer alloy portion 901, 903, the intermediate titanium layer 902 fractures, it will be understood that the remainder of the vessel will not catastrophically rupture. Specifically, failure of the remainder of the vessel will occur in an accelerated creep upon fracture of the hard, strong, rigid layer 902. This accelerated creep will terminate in a tearing open of the composite construction. As a result, the high temperature, high pressure contents of the oxygen furnace will be released without explosion.

It should also be understood that the pressure inside the vessel will also tend to elongate the vessel and the outer and inner layers 901 and 903 are subject to creep. Therefore, the layers have been provided with ridges, grooves, flanges etc. as shown in the FIGS. 9B-F so the strong rigid high strength layer 902 will support 901 against axial stretching creep as well as radial expansion creep.

While the invention has been particularly shown and described with reference to preferred embodiments thereof, it will be understood by those skilled in the art that the foregoing and other changes in the form and details may be made therein without departing from the spirit or scope of the invention.

I claim:

1. A high temperature, high pressure gas furnace comprising:
   a metallic bar fabricated from an alloy having a metallic creep responsive to high temperature stress and resistant to embrittlement, said alloy including at least 45% nickel, 15% chrome and 10% tungsten;
   said bar defining a vessel having walls, said vessel extending from one end of said bar at least partially to the other end of said bar to form an aperture within said bar;
   said walls being sufficiently thick to permit creep stress redistribution through said bar;
   an oven for receiving said bar;
   a first portion of said bar being inserted into said oven with a second portion of said bar protruding from said oven; and
   means for supplying high pressure gas to said vessel from said second portion of said bar whereby a sample placed within said first portion of said bar can be treated at high temperatures and pressures.

2. The invention of claim 1 and including a cylinder, said cylinder surrounding said bar as disposed within said oven, said cylinder given a dimension to permit thermal expansion and creep to a predetermined limit and to crack responsive to said thermal expansion and creep when said bar within said oven expands beyond a predetermined limit of creep.

3. The invention of claim 1 and wherein said metallic bar has three layers, said layers including inner and outer layers fabricated from an alloy having metallic creep responsive to high temperature stress, said inner and outer layers encasing a medial layer having high tensile strength.

4. The invention of claim 1 and wherein said metallic bar has three layers, said layers including inner and outer layers of said alloy having metallic creep responsive to high temperature stress, said inner and out layers encasing a medial layer of rigid high strength alloy having less creep responsiveness and more resistance to oxidation.

5. The invention of claim 1 wherein said alloy further includes up to 3% molybdenum.

6. In a high temperature, high pressure gas furnace having a predetermined length, wherein said furnace has a pressure chamber disposed therein, an improvement to said pressure chamber comprising:
   a metallic bar having first and second ends, wherein said bar is fabricated from an alloy having metallic creep responsive to high temperature stress and resistant to embrittlement, said alloy including at least 45% nickel, at least 15% chrome, and at least 10% tungsten;
   said bar including a bore extending from one end of said bar at least partially to the other end of said bar;
   said first end of said bar inserted interiorly of said furnace with a second portion of said bar protruding from said furnace;
   said bar having sufficient length to permit temperatures of at least 500° C. within the first portion of said bar with the second portion of said bar remaining approximately at room temperature;
   means connected to the second portion of said bar for admitting high pressure gas to said second end of said bar; and
   means for opening and closing the vessel to permit insertion and withdrawal of a sample.

7. The invention of claim 6 wherein aid alloy further includes up to 3% molybdenum.

8. A process of high temperature, high pressure gas treatment comprising the steps of providing a metallic bar, said bar having a bore extending from one end of said bar such that said bore terminates at a point adjacent the opposing end of said bar to define a vessel having an aperture at one end and said bar having metallic creep responsive to high temperature stress;
   providing a furnace;
   inserting a first portion of said bar partially into said furnace with a second portion of said bar protruding from said furnace;
   said bar having sufficient length to permit said first portion of said bar to be heated to temperatures of at least 500° C. while said second portion of said bar is substantially at room temperature;
   inserting a sample into said vessel;
   closing said aperture at said second portion of said bar; and
   supplying high pressure gas to said vessel simultaneously with heating said furnace to a temperature of at least 500° C. whereby said sample may be heated for heat treatment.

9. The process of claim 8 and wherein said step of inserting said sample into said vessel further includes:
providing a tube for insertion into said vessel;
placing said sample at the end of said tube; and
inserting said tube into said vessel to place said sample within said vessel.

10. A high temperature, high pressure oxygen furnace comprising in combination:
a containment casing defining an oven receiving concavity having first and second end walls;
said containment casing divided into first and second confronting portions for opening and closing for receiving a high pressure, high temperature vessel for the treatment of contained compounds;
a pressure vessel fabricated from an alloy having metallic creep responsive to high temperature stress, said pressure vessel having a first end for confronting one of said containment casing end walls and a second end for confronting the other containment casing end wall;
said pressure vessel having sidewalls and defining an aperture concentrically thereof, said aperture extending from said first end of said pressure vessel partially to the other end of said pressure vessel to form a closed aperture within said pressure vessel;
said aperture being defined within said pressure vessel from one end of said pressure vessel partially to and toward the opposite end of said pressure vessel to leave the sidewalls between said pressure vessel and said aperture sufficiently thick to permit creep stress redistribution throughout said pressure vessel responsive to high temperature stress from said aperture to said pressure vessel;
a furnace for receiving a first portion of said pressure vessel for heating said first portion of said pressure vessel; and
means for supplying high pressure gas from a second portion of said pressure vessel to the interior of said aperture within said pressure vessel whereby a sample placed within said first portion of said pressure vessel can be treated at high temperatures and pressures, said means for supplying high pressure gas from the second portion of said vessel including flow restriction means for limiting gas flow to said defined aperture in said pressure vessel.

11. The invention of claim 10 and wherein said means for supplying high pressure gas is communicated to a high volume burst disc safety for the rapid relief of pressure from said aperture in said pressure vessel.

12. The invention of claim 10 and wherein said containment casing includes a steel exterior surface and a shock proof lining, said shock proof lining including a layer of copper thereon.

13. The invention of claim 10 and wherein said furnace includes first and second vessel receiving portions, each said portion having insulation and heating elements, said portions together defining a volume for surrounding and receiving said pressure vessel for heating said pressure vessel.

14. The invention to claim 13 and wherein said first and second vessel receiving portions of said furnace are mounted for movement between a first vessel enclosing position for the heating of said vessel to a second and open vessel exposing position for the cooling of said pressure vessel.

15. A high pressure, high temperature furnace effective for treating compounds contained therein at high temperatures and pressures, comprising:
a containment casing defining an oven receiving concavity;
said containment casing divided into first and second confronting portions for open and closed reception of a high temperature, high pressure vessel for the treatment of contained compounds;
means for locking said respective first and second confronting portions in said closed reception of said high temperature, high pressure vessel during the treatment of contained compounds;
a pressure vessel fabricated from an alloy having metallic creep responsive to high temperature stress and resistant to embrittlement;
furnace means for receiving and heating said pressure vessel, said furnace means positioned within said containment casing;
means for introducing gas to said pressure vessel under pressure;
means for monitoring the temperature of said pressure vessel upwardly in temperature range beyond a preset lower limit; and
mean for actuating said locking means communicated to said monitoring means for maintaining said locking means locked when said pressure vessel is heated beyond said preset lower limit.

16. The invention of claim 15 and including:
means for controlling said furnace means to maintain said pressure vessel at a selected temperature;
means for limiting the temperature of said furnace means at or below at preset upper limit.

17. The invention of claim 16 and including:
means for monitoring the pressure of gas in said pressure vessel wherein said means for controlling said furnace means includes means for limiting the temperature and pressure of said vessel beyond a preset temperature and pressure.

18. A high temperature, high pressure furnace comprising in combination:
a vessel fabricated from an alloy having metallic creep responsive to high temperature stress and resistant to embrittlement;
said vessel having walls and defining an aperture extending from one end of said vessel to and toward but not through an opposite end of said vessel to form a closed aperture within said vessel;
said walls of said vessel with respect to said aperture being sufficiently thick to permit creep stress redistribution throughout said vessel responsive to creep of said vessel at said aperture responsive to high temperature stress;
an oven for receiving and heating said vessel proximate a first portion of said vessel;
the first portion of said vessel being inserted into said oven for the heating of samples lodged within the first portion of said vessel;
means for communicating gas from a second portion of the open end of said vessel to the first portion of said vessel for treating materials within said vessel under high temperatures and pressures;
a sample to be treated;
a probe having an end mounted to said sample to be treated;
resistance measuring means mounted to the end of said probe adjacent said sample for measuring the resistance of said sample during high temperature, high pressure treatment in said pressure vessel;

means mounting said probe at said aperture at the second portion of said vessel whereby resistance of said sample may be measured during high pressure, high temperature treatment of said sample within said vessel.

19. A process of curing a sample in a high temperature, high pressure furnace comprising in combination;

providing a pressure vessel fabricated from an alloy having metallic creep responsive to high temperature stress, said vessel containing a bore to define an aperture in said vessel, said bore extending from one end of said vessel to and towards but not through an opposite end of said vessel to form a closed chamber within said vessel, and said aperture having walls sufficiently thick to permit creep stress redistribution of thermal high temperature stress throughout said vessel responsive to creep of said vessel to high temperature stress;

mounting said sample to the end of a probe, said probe having a plurality of conductors for measuring resistance at the end thereof;

inserting said probe into said aperture such that said sample is substantially within a first portion of said vessel;

introducing gas from said second portion of said vessel to said first portion of said vessel and heating said first portion of said vessel for treatment of said sample under high temperatures and pressures; and measuring the resistance of said sample during said high temperature treatment to observe changes in said resistance related to said high temperature treatment.

20. A high-temperature, high-pressure furnace adapted to produce temperatures in the range of 500° C. and pressures greater than 1 atmosphere, comprising: a vessel formed from an alloy having a composition of at least 45% nickel, 15% chromium and 10% tungsten.

21. The invention of claim 20 wherein said alloy further includes up to 3% molybdenum.

22. The invention of claim 20 further comprising:

means for monitoring the temperature of said vessel upwardly in temperature range beyond a preset lower limit;

means for locking said vessel to prevent the opening of said vessel during operation; and, means for actuating said locking means communicated to said monitoring means for maintaining said locking mean locked when said vessel is heated beyond said preset lower limit.

23. The invention of claim 22 and including:

means for controlling as furnace means to maintain said vessel disposed within said furnace means at a selected temperature;

means for limiting the temperature of said furnace means above a preset upper limit.

24. The invention of claim 23 and including:

means for monitoring the pressure of gas in said furnace means includes means for limiting the temperature and pressure of said vessel beyond a preset envelope of temperature and pressure.

25. A high-pressure furnace comprising:

a pressure vessel having one end subjected to elevated temperatures and an open end at ambient temperature; and means for continuously purging gas at elevated temperatures and pressures from said vessel, said gas purge means comprising:

a plug mounted at said open end of said vessel for closure of said pressure vessel, said plug having an opening; and a tube mounted in said opening of said plug and extending from outside of said pressure vessel into a heated portion of said pressure vessel adjacent said sample, said tube for providing a passage to cool gas discharging from a portion of said vessel subjected to temperatures above at least 600° C., and said tube coupled to a condensate trap outside of said pressure vessel.

26. The invention of claim 25 further comprising a passage through flow limiting restrictor coupled to said tube outside of said pressure vessel.

27. The invention of claim 25 further comprising a passage through metering valve coupled to said tube outside of said pressure vessel.

28. The invention of claim 25 further comprising a passage through flow meter coupled to said passage through metering valve.

29. A high temperature, high pressure gas furnace comprising:

a metallic bar fabricated from an alloy having a metallic creep responsive to high temperature stress, said alloy includes at least 45% nickel, 15% chromium, and 10% tungsten;

said bar defining a vessel having walls, said vessel extending from one end of said bar at least partially to the other end of said bar to form an aperture within said bar;

said walls being sufficiently thick to permit creep stress redistribution through said bar;

an oven for receiving said bar;

a first portion of said bar being inserted into said oven with a second portion of said bar protruding from said oven; and means for supplying high pressure gas to said vessel from said second portion of said bar whereby a sample placed within said first portion of said bar can be treated at high temperatures and pressures, said sample being wrapped in gold foil.

30. A high temperature, high pressure gas furnace comprising a metallic bar fabricated from an alloy having a metallic creep responsive to high temperature stress;

said bar defining a vessel having walls, said vessel extending from one end of said bar at least partially to the other end of said bar to form an aperture within said bar;

said walls being sufficiently thick to permit creep stress redistribution through said bar;

an oven for receiving said bar;

a first portion of said bar being inserted into said oven with a second portion of said bar protruding form said oven;

means for supplying high pressure gas to said vessel from said second portion of said bar whereby a sample placed within said first portion of said bar can be treated at high temperatures and pressures; and a sample disclosed within a distal end of said aperture within said aperture is filled with a ceramic rod for a length of said tube not occupied by said sample.

31. A high-temperature, high-pressure furnace adapted to produce temperatures greater than about 600° C. and pressure greater than about 1 atmosphere comprising a metallic bar having first and second ends, said bar fabricated from an alloy having a composition of at least 45% nickel, 15% chromium and 10% tungsten, and said bar further including a bore extending inwardly from said first end to a point adjacent said second end.

32. The invention of claim 31 wherein said composition further includes not more than 2% molybdenum.

33. In a high temperature, high pressure gas furnace having a predetermined length wherein said furnace has a pressure chamber disposed therein, the improvement to said pressure chamber comprising a metallic bar fabricated from an alloy having metallic creep responsive to high temperature stress, said alloy including at least 45% nickel, at least 15% chromium, at least 10% tungsten and not more than 2% molybdenum;

said bar having an aperture defining a vessel extending from one end of said bar to at least partially to the other end of said bar;

a first portion of said bar inserted interiorly of said furnace with a second portion of said bar protruding from said furnace;

said bar having sufficient length to permit temperatures in the range of 1000° C. within the first portion of said bar with a second portion of said bar remaining approximately at room temperature;

means connected to the second portion of said bar for admitting high pressure gas; and means for opening and closing the vessel to permit insertion and withdrawal of a sample.

* * * * *